May 15, 1951  L. GRANSDEN  2,553,310
BEET GATHERER AND WINDROWER
Filed Jan. 19, 1945  3 Sheets-Sheet 1
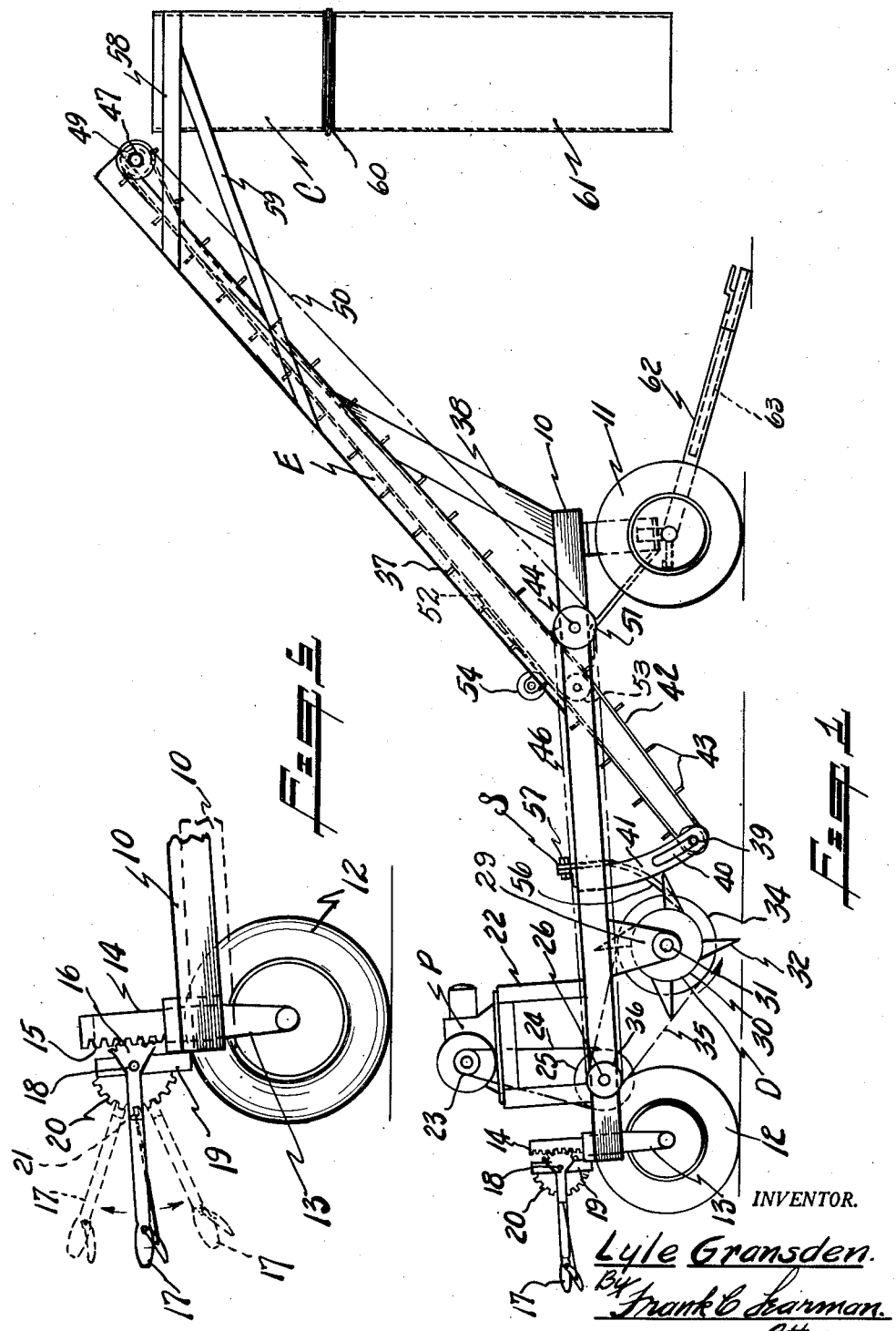
INVENTOR.
Lyle Gransden.
By Frank C. Searman.
Attorney.

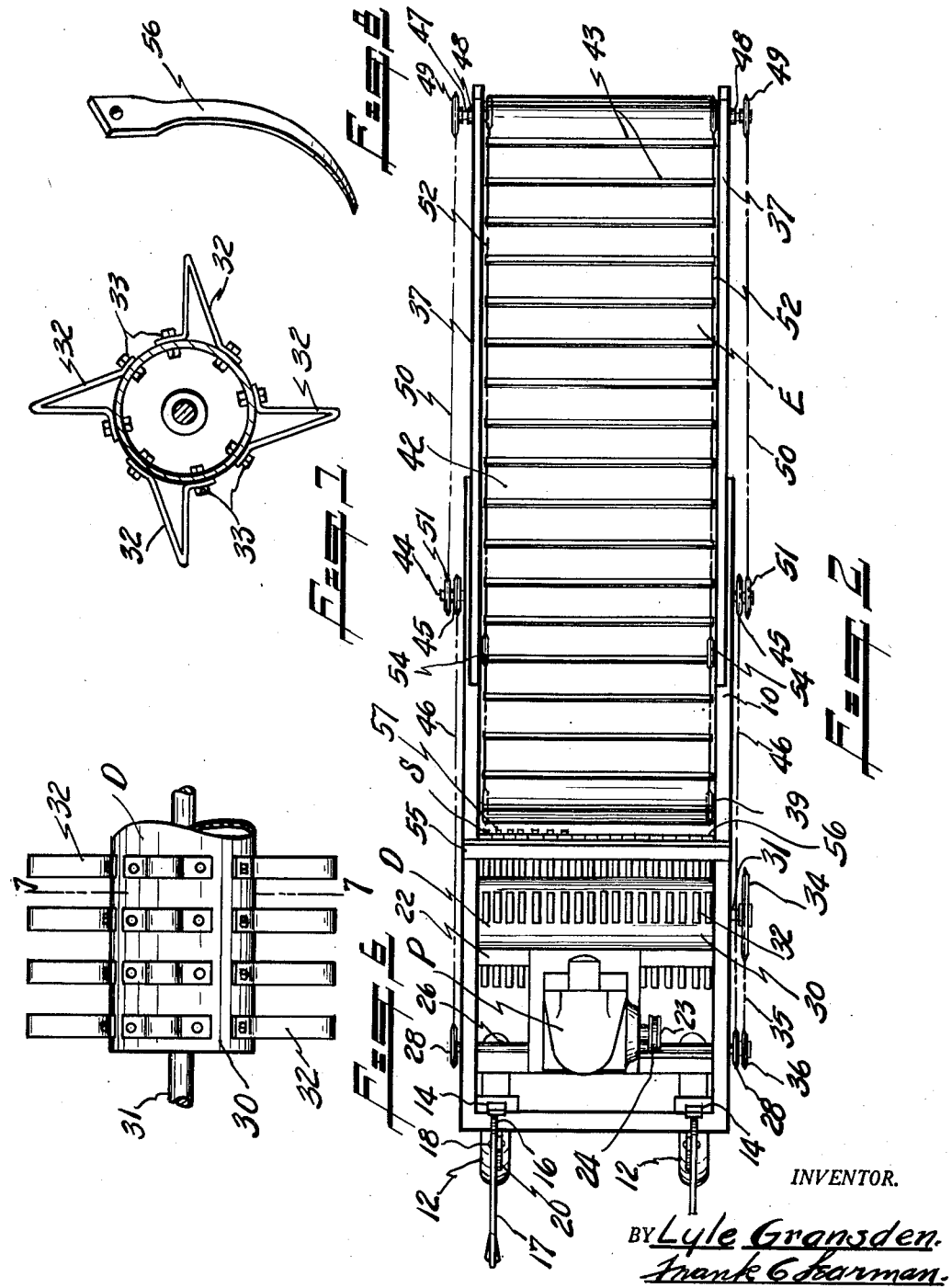

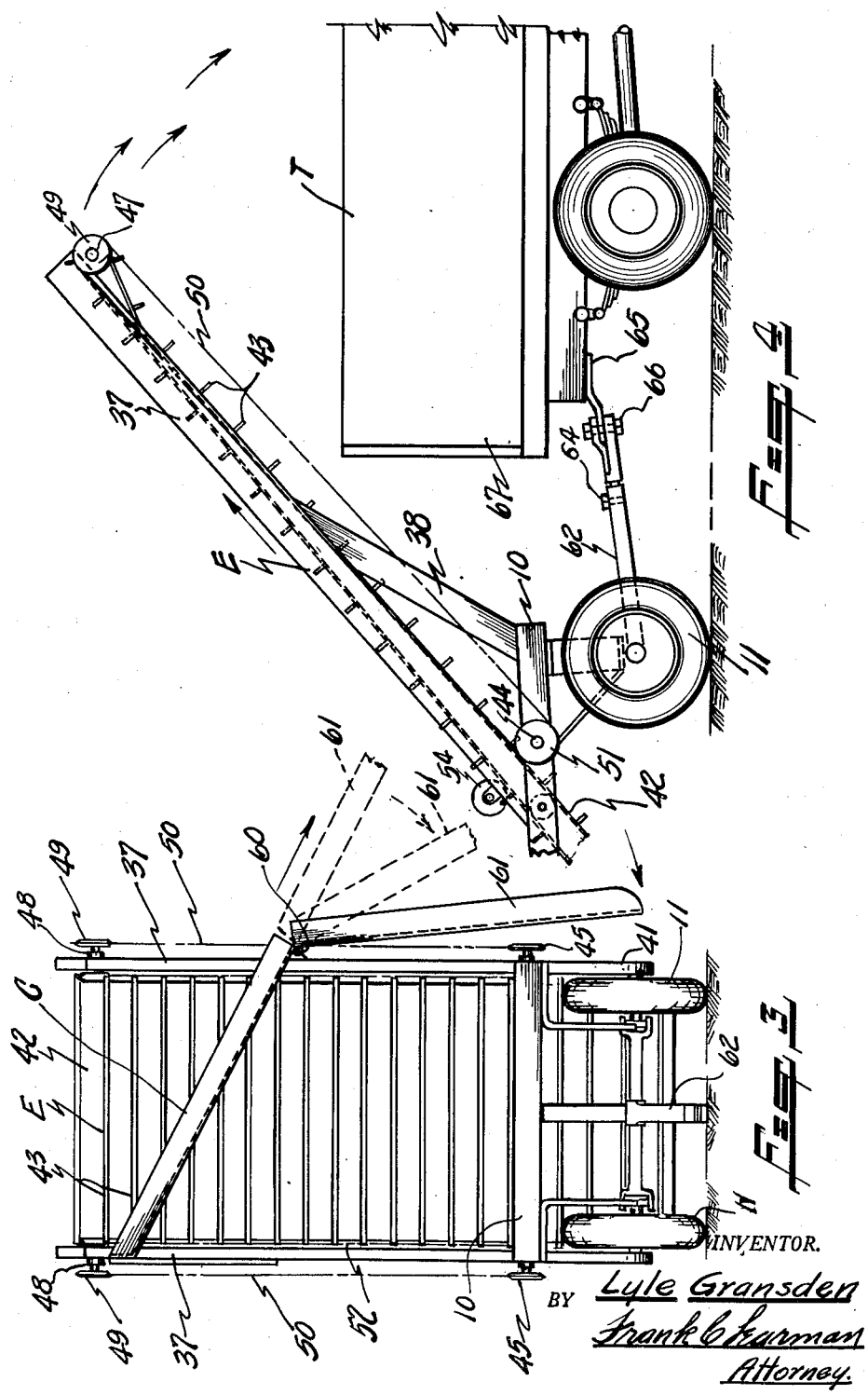

Patented May 15, 1951

2,553,310

UNITED STATES PATENT OFFICE 2,553,310

BEET GATHERER AND WINDROWER

Lyle Gransden, Edenville, Mich.

Application January 19, 1945, Serial No. 573,591

8 Claims. (Cl. 55—17)

This invention relates to loading and windrowing devices and more particularly to a loader for loading beets from piles or rows on the ground into trucks or other vehicles.

One of the prime objects of the invention is to design a simple, practical and relatively inexpensive loader by means of which beets or similar produce can be picked up and discharged in windrows preparatory to topping, after which they can again be picked up and elevated onto a truck, car, or other vehicle and without manual handling of the beets or produce.

Another object is to provide means which agitates the beets as they are being handled so that dirt and foreign matter will be removed prior to the loading into a truck or other receptacle.

A further object is to provide a loader mechanism which will handle a large tonnage of beets or produce with a minimum of labor and in a minimum of time, the loader mechanism requiring one operator only for the operation of the loader power plant and connected mechanism.

Still a further object is to provide a mobile power actuated, adjustable loader device which can be readily moved over the ground and from one location to another as desired, and which is provided with an extensible tongue for spacing the loader member from the power vehicle.

A further object still is to provide means for removing tops, weeds, and releasing beets or produce wedged between the pick-up teeth as the mechanism is operated.

A further object still is to provide means for adjusting the loader frame vertically with relation to the ground over which it travels.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit or sacrificing any of the advantages of the invention.

In the drawings:

Fig. 1 is a side-elevational view of my loader mechanism.

Fig. 2 is a top plan view thereof.

Fig. 3 is a front-elevational view of the loader, the solid lines showing the detachable discharge chute swung down, the broken lines illustrating other ranges of adjustment.

Fig. 4 is a fragmentary, side-elevational view showing the loader connected to a truck, the arrows indicating the direction of travel of the elevator and produce.

Fig. 5 is an enlarged, side-elevational view of one of the rear wheels and the adjusting means, the broken lines illustrating the adjusting of the fork.

Fig. 6 is an enlarged fragmentary view of the pick-up drum.

Fig. 7 is an enlarged, transverse, sectional view taken on the line 7—7 of Fig. 6.

Fig. 8 is an enlarged view of one of the stripper members.

The loader forming the subject matter of the instant invention is designed to pick up beets and similar produce from the ground, and is a continuation, in part, of my previously filed application for Improvements in Loaders filed September 13, 1944, Serial No. 553,914, now abandoned.

The loader proper is adapted for picking up beets or other produce previously pulled or lifted by a suitable implement or by hand, so that these beets may be elevated and deposited in windrows as the loader is drawn over the rows of lifted beets, any desired number of rows may be windrowed together, instead of being placed in piles as at present, thus making for convenient handling by the toppers who remove the tops and foreign matter.

After the produce has been topped, the loader is attached to a self-propelled truck and is again drawn over the windrows of topped beets, the loader picking up the beets and elevating them into the body of a truck which in turn transports the load to a factory or designated station. The loader tongue is made extensible so that by adjusting the length of the tongue, the loader will discharge into either the front or rear of the truck body as desired.

Referring now more particularly to the drawings in which I have shown the preferred embodiment of my invention, the numeral 10 indicates the main frame of the loader, it is preferably formed of structural members, and is supported on front and rear ground engaging wheels 11 and 12 as usual, the front wheels 11 being pivoted to steer in the conventional manner, while the rear wheels 12 are mounted on vertically disposed forks 13, which forks terminate in a shank 14 that extends through the frame, the upper end of the shank being toothed as at 15 to form a rack for engagement by the toothed segment 16 of an adjusting lever 17, this lever being pivotally mounted at 18, on the frame extension 19, and a toothed quadrant 20 is provided as usual for engagement by the manually actuated dog 21 in the conventional manner.

Both rear wheels are mounted in an identically similar manner, and a description of one will suffice for both, however, each wheel is individually adjustable to compensate for furrows or depressions in the land over which the loader is operated.

A power plant P is mounted on a platform 22 provided on the rear end of the frame, and a drive pulley 23 is provided on the power plant, a belt 24 drivingly connecting said power pulley with a similar pulley 25 is mounted on the transversely disposed drive shaft 26 which is journaled in suitable bearings provided on the frame, sprockets 28 being mounted on the opposite ends of said shaft as shown.

A pick-up drum D is journaled in hanger brackets 29 which depend from the main frame, said drum comprising a cylindrical shell 30 mounted on a shaft 31 and provided with a plurality of spaced apart rows of teeth 32 secured to said drum by means of bolts 33 or the like, a sprocket 34 being provided on one end of the shaft 31 and a chain 35 drivingly connects said sprocket with a similar sprocket 36 provided on the drive shaft 26.

An inclined elevator E is mounted on the front end of the main frame 10 and comprises side rails 37 with braces 38 secured to the frame and side rails respectively, the elevator being of conventional design, excepting that the lower shaft 39 is mounted in arcuate slots 40 provided in bearing hangers 41 so that the lower end of the elevator is free to float when traveling over piles or windrows of beets or other produce.

The elevator belt 42 is provided with transversely disposed flights 43 so that the beets or produce is readily carried upwardly as the elevator is driven.

The elevator is driven from the drive shaft 26, a transversely disposed shaft 44 being provided on the main frame 10, and sprockets 45 are mounted thereon, drive chains 46 drivingly connecting the sprockets 28 and 45. A transversely disposed shaft 47 is mounted on bearings 48 provided on the upper end of the elevator, and sprockets 49 are mounted thereon, chains 50 drivingly connecting the sprockets 49 with similar sprockets 51 provided on the shaft 44.

The slotted bearing hangers 41 permit the lower end of the elevator E to swing up when traveling over a pile of beets (not shown), or other obstacles of any nature, the chain 52 traveling over idler sprockets 53 provided on the main frame, and inasmuch as the elevator is driven from its upper end, it will be obvious that as the lower end of the elevator swings up, the face of the elevator belt will tend to leave its normal path, and I therefore provide idler sprockets 54 on the side rails 37, these idlers engage the elevator chain 52 and hold the belt in proper position.

A stripper assembly S is mounted on the main frame ahead of the pick-up drum and comprises a transversely disposed supporting bar 55 to which a plurality of spaced apart, angularly bent prongs 56 (see Fig. 8) are secured by means of bolts 57, the tapered free ends of the prongs extending between the circumferential rows of teeth 32 to strip and remove any beets, tops, weeds or other foreign matter carried by, or that may become wedged between the teeth on the drum as it is driven.

A two-part chute C is detachably secured to the conveyor frame by means of braces 58 and 59, said chute being jointed as at 60 with the lower section 61 adjustable, so that the product can be discharged in a windrow at any predetermined distance adjacent the side of the machine, the angular elevation of the lower section 61 of said chute determining the line of the windrow.

The rear wheels 12 are independently adjustable so that either one can be adjusted to maintain the frame level when one wheel travels in a furrow or other depression, the levers 17 providing for easy and quick adjustment.

After the beets are topped and ready for delivery to the factory, the chute C is removed and the loader is coupled to a truck or other vehicle T, the tongue 62 being telescopic, the member 63 being slidable in the member 62 and being held in position by the pin 64.

Shields (not shown) are provided on the end of the pick-up drum and the elevator to prevent the beets or other produce being thrown from the sides of the loader.

In practice, and when it is desired to place the beets or other produce in windrows, the loader is hitched to a powered vehicle or truck, the loader straddling the row or rows of beets or produce (not shown), and is drawn lengthwise of the rows. All mechanism on the loader is driven from the power plant P and as the pick-up drum D rotates, the teeth 32 engage the beets, throwing them upwardly onto the lower end of the elevator E, which carries them upwardly and discharges into the sectional chute C from which the produce slides, by gravity, into a windrow (not shown) as the machine travels, two or more rows can be thrown together by merely adjusting the angle of inclination of the lower section 61 of the chute.

When loading produce directly into trucks, the chute C is detached and the loader coupled to a truck T by means of the tongue 62. A coupler 65 is provided on the truck, and a pin 66 serves to secure the tongue in position so that the upper end of the elevator overhangs the truck body 67, and by adjusting the tongue, the distance between the truck and the loader can be regulated so that the truck can be easily loaded.

With trucks having high bodies, an extensible chute (not shown) amy be attached to the upper end of the conveyor frame so that the beets from the elevator may be evenly distributed in the truck body by merely adjusting the length of the chute.

From the foregoing description, it will be obvious that I have perfected a very simple, practical and substantial loader mechanism by means of which beets and other produce can be windrowed and/or loaded into trucks or other vehicles without manual labor and in a minimum length of time.

What I claim is:

1. A loading mechanism of the class described comprising a mobile frame, a toothed pick-up drum journaled on the rear end of the frame and engaging the surface of the ground over which it travels, an inclined elevating mechanism mounted on the frame directly ahead of the drum and adapted to receive the produce thrown by the teeth of the pick-up drum, means for driving said drum and elevating mechanism, and a chute detachably secured to the upper end of the elevator for directing the discharged product into windrows adjacent the loader.

2. A construction as defined in claim 1 in which the lower end of the elevator is free to float about a point intermediate the length of said elevator.

3. The construction set forth in claim 1 which includes an extensible tongue connected to the front end of the mobile frame.

4. The contruction as defined in claim 1 in which a stripper means comprising a plurality of prongs extends between the teeth on the pick-up drum for removing foreign matter and wedged beets as the drum is rotated.

5. A loader of the character described comprising a mobile frame, a driven beet pick-up drum journaled on said frame and engaging the surface of the ground over which the loader travels, an inclined elevator on the frame and spaced ahead of said drum and adapted to receive the beets therefrom, means for vertically adjusting each individual wheel on the rear end of the mobile frame, and a power plant mounted on the frame and drivingly connecting said drum and elevator.

6. The combination with a self-propelled vehicle, of a mobile loader adapted to be drawn thereby and adjustably extensible with relation thereto, a toothed pick-up drum journaled on the loader frame and engaging the surface of the ground over which it travels, an inclined elevator adapted to receive the product engaged by the pick-up drum and to elevate the produce delivered thereto, a power plant on said mobile frame and drivingly connected to said drum and elevator respectively, a stripper assembly spaced ahead of said drum and cooperating therewith, and means for vertically adjusting the rear end of said mobile frame.

7. The combination as defined in claim 6 in which the teeth on the pick-up drum are quickly replaceable.

8. A loader of the character described comprising a mobile frame, a driven beet pick-up drum journaled on said frame and engaging the surface of the ground over which the loader travels, an inclined elevator on the frame and spaced ahead of said drum and adapted to receive the produce therefrom, said elevator having free limited swinging movement about a point intermediate the length thereof, means for vertically adjusting the rear end of the mobile frame, and a power plant mounted on the frame and drivingly connecting said drum and elevator.

LYLE GRANSDEN.

REFERENCES CITED

The following references are of record in the file of this patent:

UNITED STATES PATENTS

| Number | Name | Date |
| --- | --- | --- |
| 965,115 | Moore | July 19, 1910 |
| 1,274,244 | Corey | July 30, 1918 |
| 1,356,722 | Kaupke | Oct. 26, 1920 |
| 1,562,766 | Hennig | Nov. 24, 1925 |
| 1,817,042 | Spradbrow | Aug. 4, 1931 |

FOREIGN PATENTS

| Number | Country | Date |
| --- | --- | --- |
| 666,013 | Germany | Oct. 10, 1938 |